US008462895B2

(12) United States Patent
Lovell

(10) Patent No.: US 8,462,895 B2
(45) Date of Patent: Jun. 11, 2013

(54) RECEIVER AND METHOD

(75) Inventor: Martin Lovell, Reading (GB)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 13/423,688

(22) Filed: Mar. 19, 2012

(65) Prior Publication Data

US 2012/0243596 A1    Sep. 27, 2012

(30) Foreign Application Priority Data

Mar. 24, 2011    (GB) .................... 1104983.0

(51) Int. Cl.
*H04L 27/06* (2006.01)
(52) U.S. Cl.
USPC .................... 375/340; 375/316; 375/343
(58) Field of Classification Search
USPC ......................................... 375/340
See application file for complete search history.

(56) References Cited

U.S. PATENT DOCUMENTS

| 7,242,720 | B2* | 7/2007 | Sugiyama et al. ............ 375/260 |
| 2010/0002788 | A1 | 1/2010 | Wu et al. |
| 2010/0062705 | A1* | 3/2010 | Rajkotia et al. ................ 455/1 |
| 2010/0075693 | A1* | 3/2010 | Kishigami et al. ......... 455/452.2 |
| 2010/0310016 | A1 | 12/2010 | Okehie et al. |
| 2011/0069790 | A1 | 3/2011 | Okehie |

FOREIGN PATENT DOCUMENTS

| EP | 2 259 513 A3 | 12/2010 |
| EP | 2 259 516 A2 | 12/2010 |
| EP | 2 259 517 A2 | 12/2010 |
| EP | 2 259 517 A3 | 12/2010 |
| GB | 2473674 A | 3/2011 |
| JP | 2006-101019 | 4/2006 |

OTHER PUBLICATIONS

Extended European Search Report issued Jan. 18, 2013, in European Patent Application No. 12157987.4.
Partial European Search Report issued Oct. 24, 2012, in European Patent Application No. 12157987.4.
I. Budiarjo, et al., "On the Use of Virtual Pilots with Decision Directed Method in OFDM Based Cognitive Radio Channel Estimation Using 2x1-D Wiener Filter", IEEE International Conference on Communications, 2008, XP-031265459, May 19, 2008, pp. 703-707.
Liang Zhang, et al., "Improved DFT-Based Channel Estimation for OFDM Systems with Null Subcarriers", Proceedings of the 2009 IEEE 70th Vehicular Technology Conference (VTC 2009 Fall), Sep. 20-23, 2009, 5 pages.
United Kingdom Search Report issued Jul. 25, 2011, in Great Britain Application No. GB 1104983.0 filed Mar. 24, 2011.

* cited by examiner

*Primary Examiner* — Erin File
(74) *Attorney, Agent, or Firm* — Oblon, Spivak, McClelland, Maier & Neustadt, L.L.P.

(57) ABSTRACT

A receiver receives data from a sequence of OFDM symbols transmitted via a channel, each OFDM symbol comprising a plurality of data bearing sub-carriers and a plurality of pilot bearing sub-carriers. The receiver includes a channel estimator for estimating the channel and an equalizer for reducing the effects of the channel so that the data can be recovered from the received OFDM symbols. The channel estimator includes a notch processor which is arranged in operation to detect a notch in a received OFDM symbol, the notch providing a plurality of the sub-carriers of the received OFDM symbol within a frequency range which were not transmitted by the transmitter, to determine one or more missing pilot sub-carriers which would have been transmitted within the notch sub-carriers of OFDM symbols according to a pilot sub-carrier pattern, and to generate one or more replacement pilot data symbol for a missing pilot data sub-carrier.

19 Claims, 13 Drawing Sheets

8MHz Channel Raster Parameter
(Useful symbol duration Tu = 448 usec)

| GI frac. | 1/64 | | 1/128 | |
|---|---|---|---|---|
| GI period | 7 usec | | 3.5 usec | |
| EQ Type | Time & Freq. | Freq. Only | Time & Freq. | Freq. Only |
| Sampling spacing | $Dx = 12$ | $Dx\,Dy = 48$ | $Dx = 24$ | $Dx\,Dy = 96$ |
| CIR range | $Tu/Dx =$ 37.33 usec | $Tu/DxDy =$ 9.33 usec | $Tu/Dx =$ 18.67 usec | $Tu/DxDy =$ 4.67 usec |

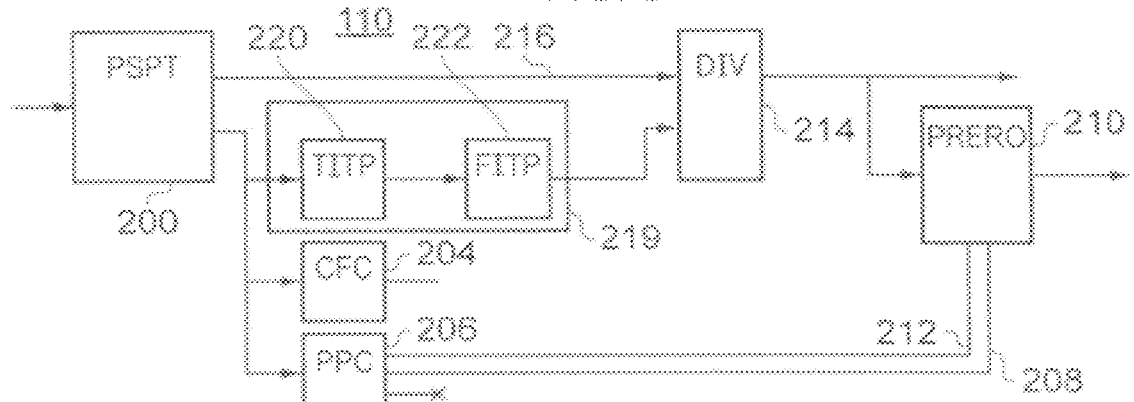
Table 3: Notch Characteristics in DVB-C2
FIG. 5
FIG. 10
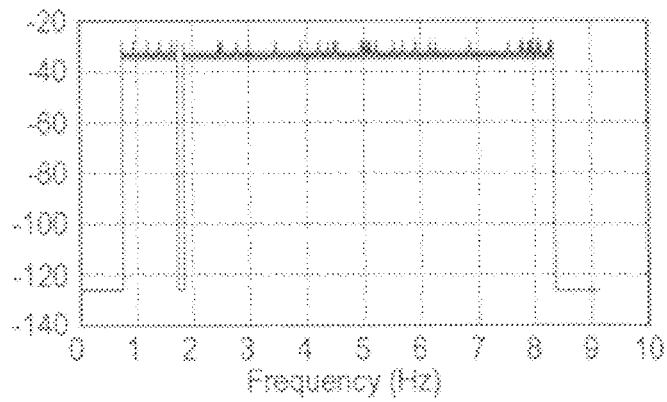
47 Notched Carriers at Transmitter output, 1MHz offset
FIG. 6

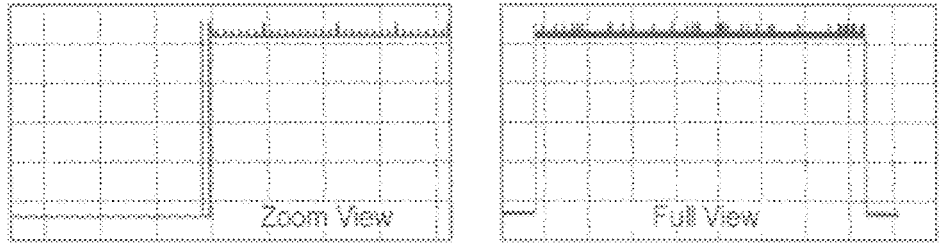
11 Notched Carriers at Transmitter Output, Left Hand Edge of OFDM Spectrum
FIG. 7
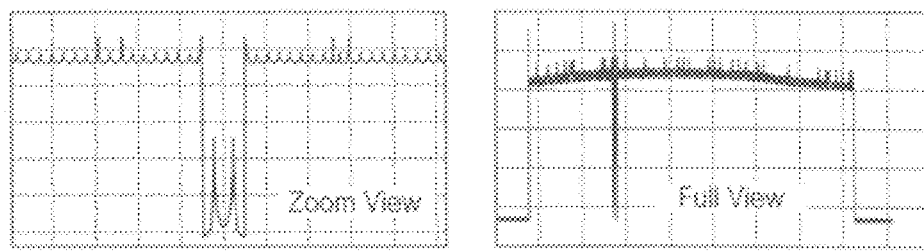
47 Notch Carriers at 2MHz Offset, Echo Profile 4 & FM Interferer centred in the notch
(Modulation = 25kHz, Deviation = 500Hz)
FIG. 8
| Notch Width (in carriers) | Number of Missing Pilots GI = 1/64 | Number of Missing Pilots GI = 1/128 |
|---|---|---|
| 11 | 0 | n/a |
| 23 | 1 | 0 |
| 35 | 2 | n/a |
| 47 | 3 | 1 |
Table 5: Number of Missing Scattered Pilots in a Narrow-band Notch
FIG. 9

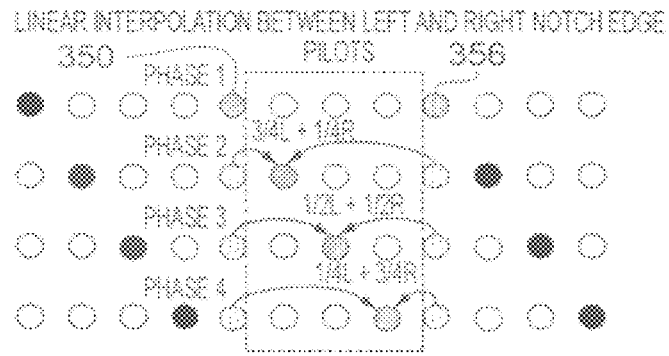
FIG. 14
| Notch Width | Guard Interval | Phase of Dy (1-4) | Interpolation |
|---|---|---|---|
| 11 | 1/64 | - | - |
| 23 | 1/64 | 3 | 1/2L + 1/2R |
| 23 | 1/128 | - | - |
| 35 | 1/64 | 2 | 2/3L + 1/3R |
| 35 | 1/64 | 3 | 1/3L + 2/3R |
| 47 | 1/128 | 3 | 1/2L + 1/2R |
| 47 | 1/64 | 2 | 3/4L + 1/4R |
| 47 | 1/64 | 3 | 1/2L + 1/2R |
| 47 | 1/64 | 4 | 1/4L + 3/4R |
Interpolation Weightings for Notch Edge Carriers
FIG. 15
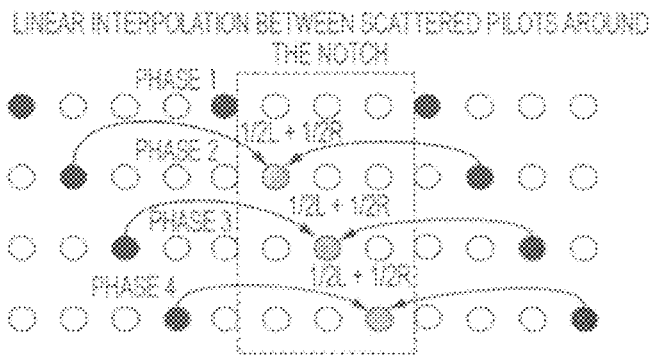
FIG. 16

MER per carrier for 47-carrier notch using copy of left edge pilot for missing notch pilot - Dy phases 2 & 3

MER per carrier for 47-carrier notch using copy of left edge pilot for missing notch pilot - Dy phases 4 & 1

| No. | Test Scenario | Notch Process Method | Average MER | Rating | Δ MER to Rating #1 |
|---|---|---|---|---|---|
| 1 | 256QAM, 5/6CR, echo profile 8 (Good), 100dB SNR, 47 empty notched carriers, 2.0MHz offset | CNEL | 54.54dB | 3 | 0.14dB |
| | | CNER | 54.53dB | 4 | 0.15dB |
| | | LIE | 54.68dB | 1 | - |
| | | LIS | 54.67dB | 2 | 0.01dB |
| | | No Notch | 55.43dB | Ref | (0.75dB) |
| 2 | 256QAM, 5/6CR, echo profile 3 (Poor), 100dB SNR, 47 empty notched carriers @ 991071 Hz, (in null) | CNEL | 51.98dB | 3 | 0.77dB |
| | | CNER | 51.78dB | 4 | 0.95dB |
| | | LIE | 52.75dB | 1 | - |
| | | LIS | 52.18dB | 2 | 0.57dB |
| | | No Notch | 53.51dB | Ref | (0.76dB) |
| 3 | 256QAM, 5/6CR, echo profile 3 (Poor), 100dB SNR, 23 empty notched carriers @ 991071 Hz, (in null) | CNEL | 53.02dB | 4 | 0.19dB |
| | | CNER | 52.97dB | 2 | 0.24dB |
| | | LIE | 53.21dB | 1 | - |
| | | LIS | 52.94dB | 3 | 0.27dB |
| | | No Notch | 53.51dB | | |
| 4 | 256QAM, 5/6CR, flat spectrum, 100dB SNR, 47 empty notched carriers @ 991071 Hz, Narrowband FM interferer centred in notch. FM dev = 1kHz, FM mod = 25KHz, 0dBc | CNEL | 52.38dB | 2 | 0.04dB |
| | | CNER | 52.42dB | 1 | - |
| | | LIE | 52.36dB | 4 | 0.06dB |
| | | LIS | 52.38dB | 2 | 0.04dB |
| | | No Notch | No lock | | |
| 5 | 256QAM, 5/6CR, echo profile 3 (Poor), 100dB SNR, 47 empty notched carriers @ 991071 Hz, (in null), Narrowband FM interferer @+7.3KHz to notch centre, FM dev = 0.5kHz, FM mod = 25KHz, 0dBc | CNEL | 39.95dB | 4 | 0.06dB |
| | | CNER | 40.00dB | 2 | 0.01dB |
| | | LIE | 40.01dB | 1 | - |
| | | LIS | 39.95dB | 3 | 0.05dB |
| | | No Notch | No lock | | |
| 6 | 256QAM, 5/6CR, echo profile 3 (Poor), 100dB SNR, 47 empty notched carriers @ 3000Hz, (at left edge of OFDM spectrum) | CNEL | 52.45dB | 4 | 0.44dB |
| | | CNER | 52.58dB | 3 | 0.31dB |
| | | LIE | 52.89dB | 1 | - |
| | | LIS | 52.77dB | 2 | 0.12dB |
| | | No Notch | 53.51dB | Ref | |
| 7 | 256QAM, 5/6CR, echo profile 3 (Poor), 24.4dB SNR, 47 empty notched carriers @991071 Hz, (in null) | CNEL | 24.72dB | 2 | 0.01dB |
| | | CNER | 24.64dB | 4 | 0.09dB |
| | | LIE | 24.72dB | 2 | 0.01dB |
| | | LIS | 24.73dB | 1 | - |
| | | No Notch | 24.97dB | Ref | (0.26dB) |

Table 7: Performance comparison of Notch Processing Methods under different Test Scenarios

FIG. 21

RECEIVER AND METHOD

FIELD OF THE INVENTION

The present invention relates to receivers and methods for receiving Orthogonal Frequency Division Multiplexed (OFDM) symbols, at least some of the OFDM symbols including a plurality of data bearing sub-carriers and a plurality of pilot bearing sub-carriers.

BACKGROUND OF THE INVENTION

There are many examples of communications systems in which data is communicated using Orthogonal Frequency Division Multiplexing (OFDM). Systems which have been arranged to operate in accordance with Digital Video Broadcasting (DVB) standards for example, use OFDM. OFDM can be generally described as providing K narrow band sub-carriers (where K is an integer) which are modulated in parallel, each sub-carrier communicating a modulated data symbol such as Quadrature Amplitude Modulated (QAM) symbol or Quadrature Phase-shift Keying (QPSK) symbol. The modulation of the sub-carriers is formed in the frequency domain and transformed into the time domain for transmission. Since the data symbols are communicated in parallel on the sub-carriers, the same modulated symbols may be communicated on each sub-carrier for an extended period, which can be longer than a coherence time of the radio channel. The sub-carriers are modulated in parallel contemporaneously, so that in combination the modulated carriers form an OFDM symbol. The OFDM symbol therefore comprises a plurality of sub-carriers each of which has been modulated contemporaneously with different modulation symbols.

To facilitate detection and recovery of the data at the receiver, the OFDM symbol can include pilot sub-carriers, which communicate data-symbols known to the receiver. The pilot sub-carriers provide a phase and timing reference, which can be used to estimate an impulse response of the channel through which the OFDM symbol has passed, to facilitate detection and recovery of the data symbols at the receiver. In some examples, the OFDM symbols include both Continuous Pilot (CP) carriers which remain at the same relative frequency position in the OFDM symbol and Scattered Pilots (SP). The SPs change their relative position in the OFDM symbol between successive symbols, providing a facility for estimating the impulse response of the channel more accurately with reduced redundancy.

In co-pending UK patent application number GB0909579.5 there is disclosed a receiver for receiving a sequence of OFDM symbols transmitted via a channel, and in particular a receiver for receiving OFDM symbols, which have been transmitted in accordance with DVB-T2. Each OFDM symbol comprises a plurality of data bearing sub-carriers on which data is transmitted and a plurality of pilot bearing sub-carriers on which pilot data is transmitted. The pilot sub-carriers are distributed throughout the OFDM symbols of the sequence in accordance with a predetermined pilot sub-carrier pattern. The receiver includes a channel estimator, and the channel estimator includes a pilot data extractor for extracting pilot data from the pilot sub-carriers of each OFDM symbol; a pilot data extrapolator for generating extrapolated pilot data based on pilot data extracted from the pilot data sub-carriers; and a pilot data interpolator operable to process the pilot data by interpolating between the extrapolated pilot data in time and frequency to produce an estimate of the channel. The receiver also comprises a discontinuity detector for detecting a discontinuity in the pilot data processed by the channel estimator, and a controller, which upon detection of a pilot data discontinuity by the discontinuity detector, is operable to provide a control signal to the channel estimator which causes at least one of the pilot data extractor, the pilot data extrapolator and the pilot data interpolator to compensate for the pilot data discontinuity in the pilot data. As such the receiver can be arranged to receive data from OFDM symbols, such as DVB-T2, which include a number of features which may give rise to discontinuities in pilot data extracted at the receiver. In order to accommodate a resulting discontinuity, in the pilot data symbols caused by a discontinuity the receiver is arranged to detect pilot data discontinuities at the receiver and a controller is provided for ensuring that upon detection of a discontinuity in the pilot data, at least one part of the channel estimator is adapted so as to accommodate for the discontinuity.

However it is envisaged that there is a requirement for further improvements in receivers which must cope with discontinuities in pilot sub-carriers.

SUMMARY OF INVENTION

According to an aspect of the present invention there is provided a receiver for receiving data from a sequence of OFDM symbols transmitted via a channel, each of the OFDM symbols comprising a plurality of data bearing sub-carriers on which the data is transmitted and a plurality of pilot bearing sub-carriers on which pilot symbols are transmitted. The channel may be for example a DVB-C2 channel. The pilot sub-carriers are arranged within the OFDM symbols in accordance with a predetermined pilot sub-carrier pattern. The receiver comprises a channel equaliser comprising a pilot data extractor for extracting received pilot data symbols from the pilot sub-carriers of each of the received OFDM symbols, a channel estimator which is arranged in operation to generate an estimate of a channel through which the received OFDM symbols have passed using the received pilot data symbols from the received pilot sub-carriers by comparing the received pilot data symbols with a version of the pilot data symbols transmitted with the OFDM symbols, and an equaliser. The equaliser is arranged in operation to reduce the effects of the channel on the received OFDM symbols using the estimate of the channel generated by the channel estimator, so that data can be recovered from the received OFDM symbols. The channel estimator includes a notch processor which is arranged in operation to detect a notch in a received OFDM symbol, the notch providing a plurality of the sub-carriers of the received OFDM symbol within a frequency range which were not transmitted by the transmitter, to determine one or more missing pilot sub-carriers which would have been transmitted within the notch sub-carriers of OFDM symbols according to the pilot sub-carrier pattern, and to generate a replacement pilot symbol for a pilot data sub-carrier, which would have been transmitted according to the predetermined pattern but was not transmitted as a result of the notch, from one or more other pilot sub-carriers which have been received within OFDM symbols which are not within the notch. A pilot data interpolator is arranged in operation to process the received pilot symbols and the replacement pilot symbol by interpolating between the pilot data symbols in time and frequency to produce the estimate of the channel.

One example of a system which communicates using OFDM, in which OFDM symbols are embedded with pilot symbols, is the DVB-T2 system. Several features of this system can cause a discontinuity in the pilot data symbols. For example a discontinuity in the pilot data symbols can be caused as a result of an initialisation of the pilot data extrapolator resulting in a delay in generation of extrapolated pilot data, or as a result of frames of a different length, which can cause a "phase" of the scattered pilot sub-carrier pattern to be disrupted from frame to frame or as a result of pilot data not being arranged in conformance with the pilot sub-carrier pattern or due to one or more OFDM symbols not including any pilot data. This may be the case if the sequence of received OFDM symbols includes a Future Extension Frame (FEF). As such a receiver which can accommodate such discontinuities is disclosed in GB0909579.5 as mentioned above. However in communications systems such as DVB-C2 a notch in the frequency range can be introduced at the transmitter which results in an entire range of sub-carriers within the frequency range of the notch to be suppressed at the transmitter. As a result a receiver must be arranged to accommodate a loss of pilot data sub-carriers within the frequency range of the notch for a plurality of OFDM symbols. As such an absence of pilot data symbols for the plurality of OFDM symbols must be accommodated.

Accordingly embodiments of the present invention provide a notch processor which generates one or more replacement pilot data symbols from the received pilot data symbols, which have been recovered from the pilot sub-carriers of received OFDM symbols. The replacement pilot data symbols may be generated for example by selectively copying pilot data symbols from the OFDM symbols or by interpolating between the received pilot data symbols. The channel estimator can be arranged therefore to recover an estimate of the channel even though the presence of the notch causes one or more of the sub-carriers of the pilot pattern to be missing, the estimate of the channel having a greater accuracy than could be achieved by estimating the channel without the pilot sub-carriers which are missing because of the notch. An improvement in the likelihood of correctly recovering the data can be thereby achieved.

For some examples of notches, for an example of a Guard Interval of 1/64 then the number of notched sub-carriers carriers can range from 11 to 47. The guard interval can be for example one of 1/64 and the number of carriers could be 11, 23, 35 or 47 or the guard interval could be 1/128 and the number of carriers could be 23 or 47. Thus there are limited choices and these choices are defined by the scattered pilot spacing appropriate to the guard interval selected. For 11 carriers the equalization process is unaffected as no scattered pilots will lie inside a notch. There is no performance impact as the data carriers in the notch are not carrying transmitted data and no scattered pilots are affected in the received sequence. Therefore in some examples the notch processor is arranged to determine whether there are one or more missing pilot sub-carriers which need to be replaced.

If there is a pilot sub-carrier missing on one or more phases of the scattered pilots of the predetermined pattern, a discontinuity in the frequency interpolator may be caused, which can degrade performance of the channel estimator. In some examples, the notch processor is arranged to replace the missing pilot symbols using one or more of:

Copying of notch start/end edge pilots
Linear interpolation between the notch edge pilots
Linear interpolation between scattered pilots around the notch Various further aspects and features of the invention are defined in the appended claims, which include a method of receiving.

BRIEF DESCRIPTION OF THE DRAWINGS

Embodiments of the present invention will now be described by way of example only with reference to the accompanying drawings where like parts are provided with corresponding reference numerals and in which:

FIG. 5 provides a table providing an illustration of a number of pilots in a scattered pilot pattern for DVB-C2;

FIG. 6 provides a graphical representation of a plot of amplitude against frequency for an OFDM symbol illustrating a notch of 47 sub-carriers at a 1 MHz offset;

FIG. 7 provides a graphical representation of a plot of amplitude against frequency for an OFDM symbol illustrating a notch of 11 sub-carriers at the left edge of the OFDM spectrum;

FIG. 8 provides a graphical representation of a plot of amplitude against frequency for an OFDM symbol illustrating a notch of 47 sub-carriers at a 2 MHz offset with a simulated echo profile and a frequency modulated interferer centred in the notch;

FIG. 9 provides a table providing an illustration of a number of missing scattered pilots in a narrow-band notch;

FIG. 10 provides a schematic diagram of an equaliser for the OFDM receiver shown in FIG. 2 according to a conventional arrangement;

FIG. 14 provides a schematic diagram representing four OFDM symbols with a notch of 47 sub-carriers illustrating a technique for generating replacement sub-carriers by combining edge pilot sub-carriers from the left side and the right side of the notch;

FIG. 15 is a table of parameters which provide weighting factors for use in combining the edge pilot sub-carriers from the left and the right of the notch for the technique illustrated in FIG. 14;

FIG. 16 provides a schematic diagram representing four OFDM symbols with a notch of 47 sub-carriers illustrating a technique for generating replacement sub-carriers by interpolating between scattered pilot sub-carriers within the OFDM symbols;

FIG. 21 provides a table providing comparative parameters illustrating a performance of different techniques for estimating the replacement pilot symbol values performed by a notch processor according to the present technique.

DESCRIPTION OF EXAMPLE EMBODIMENTS

OFDM Transmitter and Receiver

Figure 1:
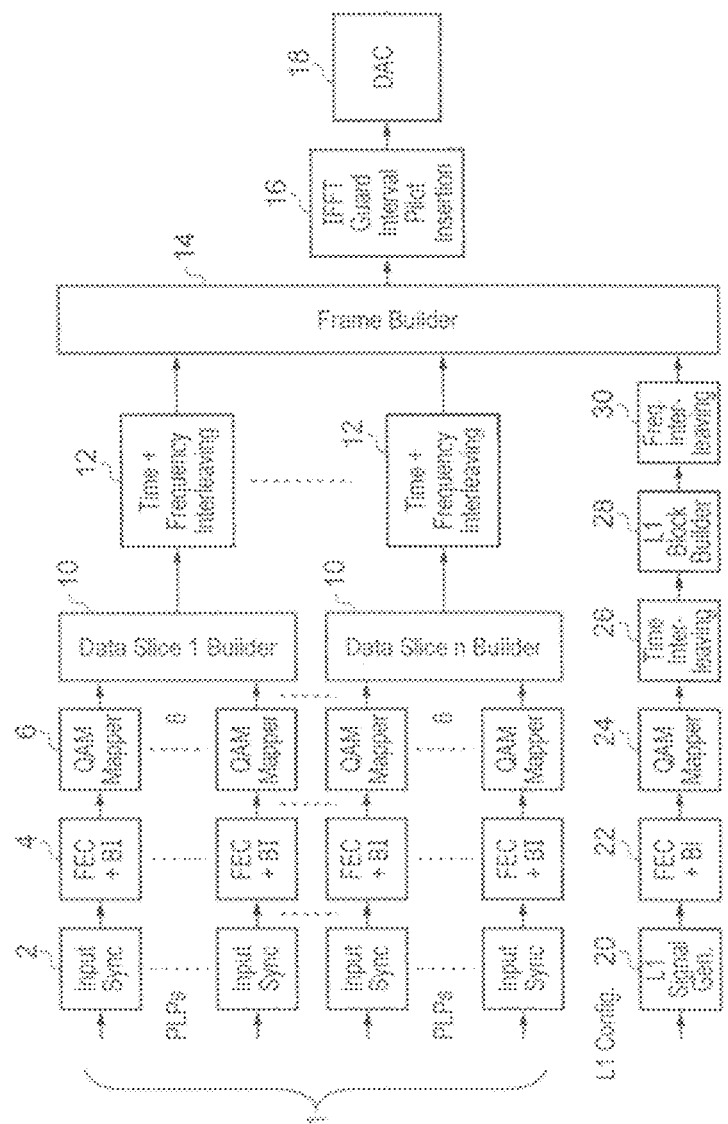
FIG. 1 provides a schematic diagram showing a typical DVB-C2 transmitter chain.

FIG. 1 provides an example block diagram of an OFDM transmitter which may be used for example to transmit video images and audio signals in accordance with the DVB-C2 standard. FIG. 1 has been reproduced from ETSI standard EN 302769, section 5, FIG. 2e are will be briefly described here to assist in understanding the example embodiment. In FIG. 1 sources of data, which are referred to in DVB-C2 as Physical Layer Pipes (PLP) 1 are received for transmission. The data is received at an input synchronisation unit 2 before being encoded with a forward error correction encoder and bit interleaved by a unit 4. The encoded and interleaved data is then fed to a Quadrature Amplitude Modulation (QAM) Mapper 6, which maps the binary data onto QAM modulation symbols. The QAM symbols from groups of PLPs 8 are then fed to respective DATA SLICE builders 10 are combined into respective DATA SLICES which combine data from more than one PLP 1. The modulation symbols for each DATA SLICE is then time and frequency interleaved, by time and frequency interleavers 12. The interleaved modulation symbols are then fed to a frame builder 14, which then forms the modulation symbols into frames for transmission as OFDM symbols. The OFDM symbols are then formed in the time domain and a guard period is inserted by an Inverse Fourier Transform and Pilot insertion unit 16. The OFDM symbols are converted from digital to analogue by a digital to analogue converter (DAC) 18.

A separate transmitter chain in FIG. 1 is provided for communicating system signalling data known as L1 signalling data, which comprises an L1 signal generator 20, a forward error correction and bit interleaver block 22 a QAM mapper 24 a time interleaver of the resulting modulation symbols 26 and L1 block builder 28 and a frequency interleaver unit 30. The time and frequency interleaved modulation symbols representing the L1 data is then formed into an time divided frame as an OFDM symbol by the frame builder 14.

The transmitter shown in FIG. 1 is arranged to generate OFDM symbols according to the DVB-C2 standard which comprise a number of data cells, each data cell carrying a modulation symbol and each being mapped onto one of the sub-carriers of the OFDM symbol. The number of sub-carriers for DVB-C2 is fixed at 3409.

Figure 2:
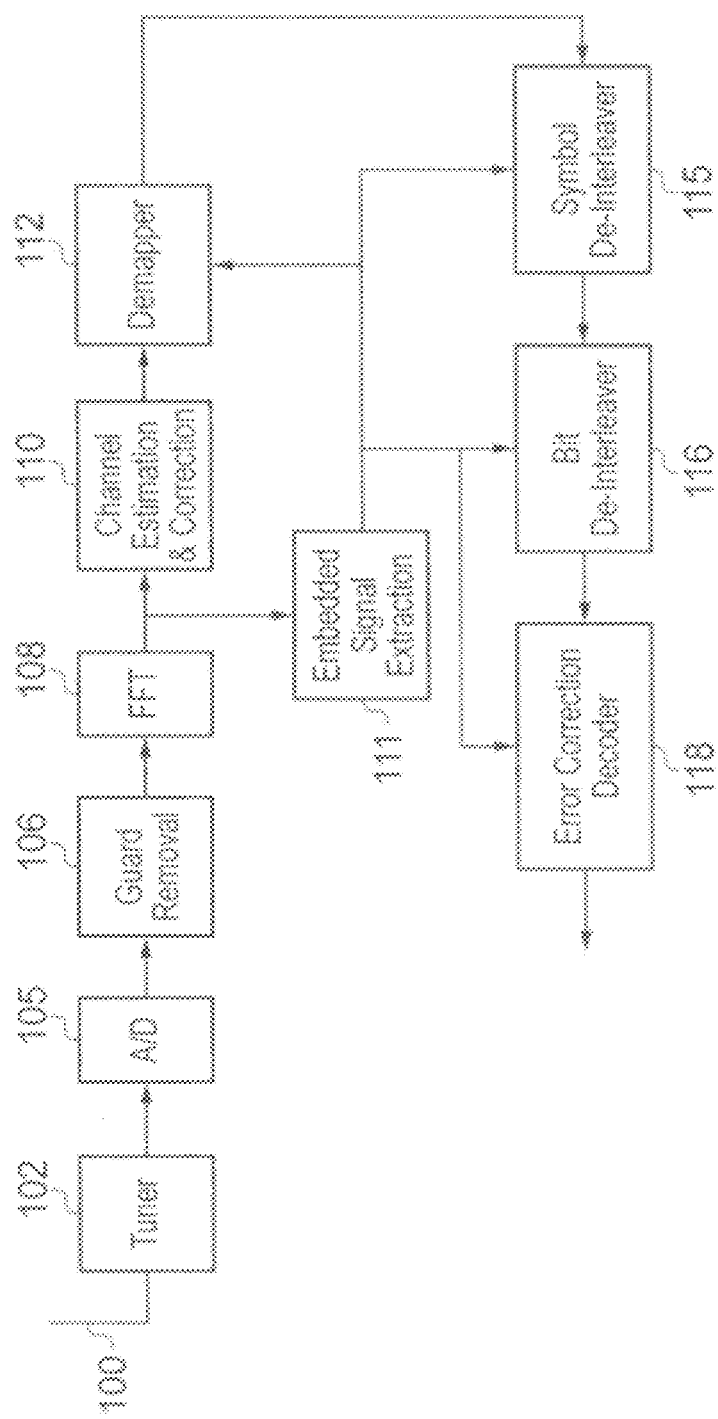
FIG. 2 provides a provides a schematic diagram showing a typical DVB-C2 receiver chain.

FIG. 2 provides an example illustration of a receiver which may be used with the present technique. As shown in FIG. 2, an OFDM signal is received from a network connection 100 and detected by a tuner 102 and converted into digital form by an analogue-to-digital converter 105 A guard interval removal processor 106 removes the guard interval from a received OFDM symbol, before the data is recovered from the OFDM symbol using a Fast Fourier Transform (FFT) processor 108 in combination with a channel estimator and corrector 110 and an embedded-signalling decoding unit 111. The demodulated data is recovered from a de-mapper 112 and fed to an OFDM symbol de-interleaver 115, which operates to effect a reverse mapping of the received data OFDM symbol to re-generate an output data stream with the data de-interleaved. Similarly, the bit de-interleaver 116 reverses the bit interleaving performed by the bit interleaver 26. The remaining parts of the OFDM receiver shown in FIG. 2 are provided to effect error correction decoding 118 to correct errors and recover an estimate of the source data.

DVB-C2 OFDM Symbols

Figures 3, 4:
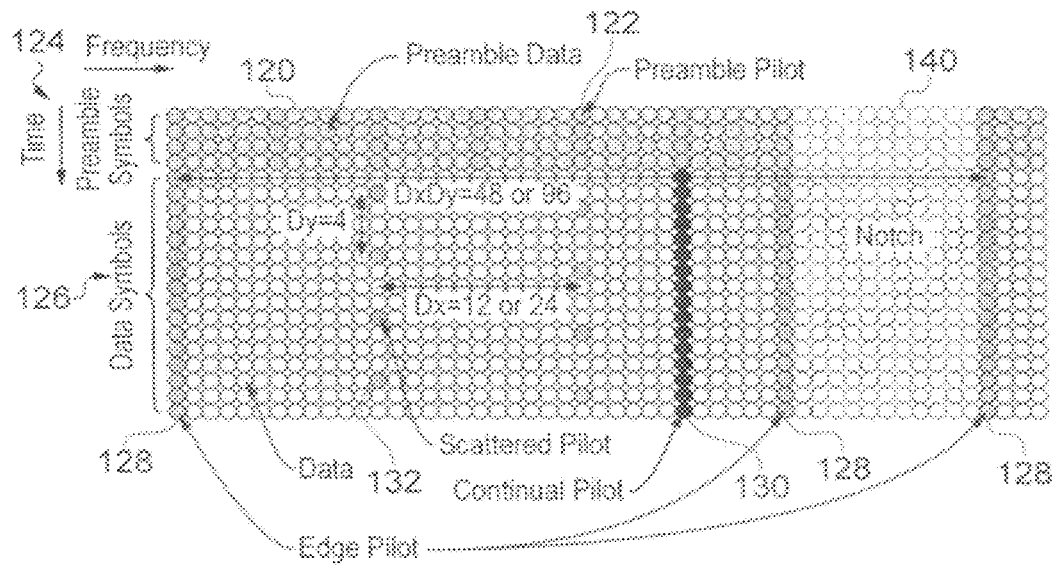
FIG. 3 provides a schematic diagram showing a sequence of OFDM symbols, which are generated for example according to the DVB-C2 standard.
FIG. 4 provides a table defining nyquist limits for two guard interval periods and two channel estimation methods in DVB-C2.

FIG. 3 provides an illustrative representation of a frame structure which has been proposed for DVB-C2. In FIG. 3 each of the small circles represent "a cell" which is the term used for a data symbol carried by a sub-carrier of an OFDM symbol. As such in FIG. 3 each of the rows represents a single OFDM symbol, being formed the cells of the row, so that from left to right each of the cells forms part of a single OFDM symbol. Each of the columns therefore represents cells transmitted on the sub-carriers of successive OFDM symbols in time.

There are three types of pilots in DVB-C2: Continual, scattered and edge pilots:
  The continual pilots are at fixed carrier positions in the OFDM spectrum and are transmitted every symbol. These are typically used for common phase error (CPE) and time/frequency offset correction
  The scattered pilots are used for channel estimation and equalisation. The pilot patterns are taken from PP5 and PP7 in DVB-T2 and provide the option for the receiver to use frequency-only or frequency+time interpolation to derive the channel estimates
  The edge pilots are used both for defining the edges of the OFDM signal (outer most carriers) and for defining the edges of a narrowband notch. The edge pilots always reside at scattered pilot pattern positions As shown in FIG. 3 the first four OFDM symbols are preamble symbols 124, which include preamble signalling data 120 and preamble pilot symbols 122. Following the preamble OFDM symbols 124 are successive data bearing OFDM symbols 126. Each of the data bearing OFDM symbols 126 includes edge pilots 128 continuous pilot sub-carriers 130 and scattered pilot sub-carriers 132. The edge pilots, scattered pilots and continuous pilots are transmitted in accordance with a predetermined pilot sub-carrier pattern. The scattered pilot sub-carrier pattern for DVB-C2 is illustrated in the table showing in FIG. 4.

As shown in FIG. 3, the scattered pilot sub-carriers change their relative position in the OFDM symbols from one symbol to the next, so that in accordance with a repeating pattern, within a predetermined number of OFDM symbols of a cycle, a regularly spaced sample of the channel is provided. The spacing of the channel samples which is provided by the pattern of scattered pilots is less than a spacing which is provided for any one OFDM symbol. Thus by generating an estimate of the channel using a sequence of OFDM symbols over the repeating cycle a bandwidth of the channel estimate can be much greater than that which can be achieved from one OFDM symbol. Accordingly using time and frequency interpolation of the samples of the channel acquired by the scattered pilots as well as the continuous and edge pilots an estimate of the channel can have a much greater bandwidth. The repeating pattern of the scattered pilots can be referred to as a cycle which comprises a number of phases, each phases specifying the location of the scattered pilots according to the predetermined pattern. A separation in time between pilot symbols before the cycle again produces a scattered pilot at the same location is referred to as Dy, whereas a separation in frequency between one scattered pilot in one OFDM symbol and the scattered pilot in the next OFDM symbol is Dx. In FIG. 3, Dy=4 and Dx=12 or 24 depending on the guard interval and guard pattern as shown in FIG. 4.

Narrow Band Notches

In the DVB-C2 standard a communications channel through which OFDM symbols are transmitted requires that within a certain range of frequencies. OFDM sub-carriers are not transmitted. Thus a "notch" of frequencies is removed from the OFDM symbols at transmission so as not to interfere with legacy systems. As such an equalizer in a receiver of the OFDM symbols must be adapted and arranged to estimate a communications channel through which the OFDM symbols have passed and to cancel or at least reduce the effects of the channel, without having samples of the channel within the frequency range due to the presence of the notch.

As illustrated in FIG. 3 a feature of DVB-C2 is the presence of a notch 140 providing a continuous set of sub-carriers which are not transmitted by the transmitter. DVB-C2 defines several types of notches which are broadband and narrowband. The notches are provided in order to prevent the transmission of the DVB-C2 signal interfering with other communications channels which are transmitted in band. The different notch types which are incorporated into the DVB-C2 standard are shown in the table in FIG. 5.

There are two defined notch types in C2, which are broadband and narrowband. Spectrum notches can exist anywhere in the transmitted OFDM spectrum. The notch can be present to ensure no DVB-C2 signal carriers cause external interference at a particular frequency or to enable an interfering signal to co-exist with the transmitted OFDM signal.

As shown in FIGS. 6, 7 and 8, a frequency spectrum of a transmitted OFDM symbol according to respective example types of notch are shown illustrated as a plot of frequency against time. FIG. 6 provides a notch with a 1 MHz offset which notches out of the transmitted OFDM symbols 47 carriers, FIG. 7 illustrates an example where 11 carriers are notched from the OFDM symbols whereas FIG. 9 illustrates an example where 47 carriers are notched from the OFDM sub-carriers at a 2 MHz offset and an echo profile numbered 4 and frequency modulation interferer centred within the notch. Thus according to the present technique as a result of the DVB-C2 system a number of sub-carriers will be notched out from the transmitted OFDM symbols which depends on the guard interval. FIG. 9 provides a table representing the number of sub-carriers which are notched out as a result of the narrowband notches, which are a function of the guard interval.

Narrowband notches are treated differently for preamble and data symbols. This is to allow initial decoding of the preamble symbols without any knowledge of the C2 signal, the overall structure and location of the L1 signaling blocks is not changed. Preamble sub-carriers within narrowband notches are therefore simply blanked but can be recovered by the robust FEC on the receiver side. In contrast, notched sub-carriers in data symbols are not used for payload transmission.

Up to 15 discrete notches can be signaled in a C2 Frame, enabling a mix of non C2-related interfering signals and sensitive spectrum areas to co-exist with C2 transmissions. Not more than one narrowband notch must be located in a Data Slice although more than one narrowband notch could exist in a standard 8 MHz receiver tuning window if multiple DATA SLICES are defined to exist within the bandwidth of the L1 signaling (7.61 MHz).

For channel estimation, frequency only mode, mentioned above has the benefit of zero delay in deriving the channel estimate but the disadvantage that the maximum echo that can be equalised is limited to 9.3 µs (GI=1/64) or 4.6 µs (GI=1/128). As mentioned above, frequency only mode uses only pilot sub-carriers within a single OFDM symbol to estimate the channel. In frequency and time mode the echo duration increases by a factor 4 over these values at the expense of some initial delay. The time interpolator can maximize performance in a static channel by taking advantage of the fact that there is a strong correlation in pilot values over a long time interval.

Conventional Equaliser Structure

According to embodiments in the present technique there is provided an equaliser which performs a channel estimation and cancellation of that channel from the received OFDM symbols but accommodates the presence of the notch within the transmitted OFDM symbols as transmitted for example in DVB-C2.

An equaliser for use in cancelling or at least reducing the effects of a channel from received OFDM symbols according to a conventional operation is shown in FIG. 10. The equaliser structure shown in FIG. 10 forms part of the channel estimation and correction unit 110, shown in FIG. 2. In FIG. 10 the sub-carrier signals for each OFDM symbol are received from the FFT unit 108 in the frequency domain at a pilot separator 200. The pilot separator extracts the pilot sub-carriers which may be continuous sub-carriers, edge pilot sub-carriers or scattered pilots as illustrated in FIG. 3. The scattered pilot sub-carriers are fed to a channel estimator 202 whereas the continuous pilot signals are sent to a coarse frequency corrector 204 whereas the preamble pilots are sent to a preamble pilot processing corrector 206. The preamble processing unit 206 is arranged to generate a tuning offset signal fed on a channel 208 to a preamble reordering unit 210. The preamble pilot processing unit also generates a preamble signal fed on a channel 212 to the preamble reordering unit 220. However these units do not concern the present technique and so will not be described further.

A divider unit 214 is arranged to remove the effects of the transmission channel through which the OFDM symbols were received. Thus in operation the pilot separator 200 separates the data bearing sub-carriers from the pilot bearing sub-carriers and feeds the data bearing sub-carriers on a channel 216 to the dividing unit 214. The scattered pilot sub-carriers and the continuous pilot sub-carriers are fed to the channel estimator 202 which includes a time interpolation processor 220 and a frequency interpolation processor 222. Thus the scattered and/or continuous pilot data symbols recovered from the pilot sub-carriers are interpolated and in time and frequency by the respective time and frequency interpolators 220, 222 so that a sample of the estimated channel can be generated, for each of the data bearing sub-carriers of the OFDM symbols, by comparing the pilot data symbols with a version of those pilot data symbols when they were transmitted. The samples of the channel estimate or the interpolated pilot data are fed to the divider unit 214, depending on whether the comparison with the transmitted versions of the pilot is done before interpolation or within the divider unit 214. Thus the divider unit 214 cancels the effect of the channel from the received data bearing sub-carriers by dividing the frequency domain version of the data bearing sub-carriers by the frequency domain version of the estimated channel to reduce the effects of the channel from the OFDM symbols.

Equalizer Structure According to One Example

Figure 11:
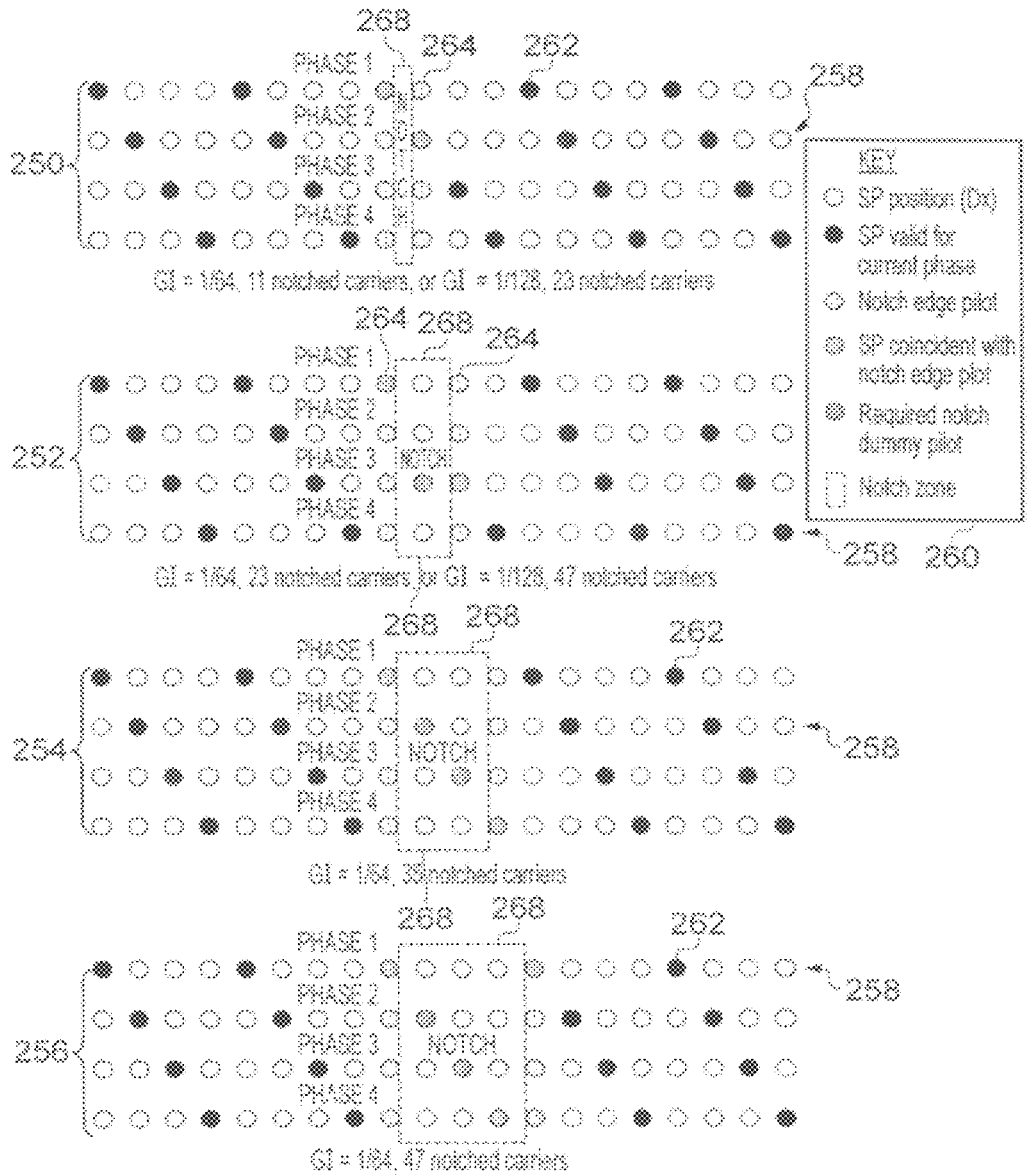
FIG. 11 provides a schematic diagram illustrating OFDM symbols which include notches of various sizes.

FIG. 11 illustrates an effect of four different notch sizes with respect to four sample OFDM symbols 250, 252, 254, 256, each of which is shown to include 20 cells or sub-carriers 258. As shown by a legend 260 each of the four OFDM symbols include both scattered pilots 262 and notch edge pilots 264. Also shown for each of the full sets of OFDM signals 250, 252, 254, 256 is a notch 268 which varies in width. Within the notch 268 there is included an indication of pilot symbols which need to be included in order to estimate the channel. Accordingly embodiments in the present technique provide arrangements for estimating the pilot sub-carriers or pilot data symbols which fall within the notch and so are not transmitted but are estimated using the other received pilot sub-carriers within the OFDM symbols. For the example of a Guard Interval of 1/64 then the number of notched carriers can range from 11 to 47. For 11 carriers the equalization process is unaffected as no scattered pilots can lie inside a notch (Dx=12). There is no performance impact as the data carriers in the notch are not carrying transmitted data and no scattered pilots are affected in the received sequence. If the notch width is increased then the numbers of missing pilots increases according to the table shown in FIG. 9.

If the width of a notch exceeds 11 carriers (for GI=1/64, or 23 carriers if GI=1/128) there will be at least one pilot carrier on one or more phases of the scattered pilots according to the predetermined pattern of pilot sub-carriers which will be invalid. This will cause a discontinuity in the response of the time interpolator 220 and frequency interpolator 222 and degrade performance so some method to pre-process the pilots is required in the time interpolator 220 and before they go through the frequency interpolator 222. This method is termed "notch processing". Notch processing requires knowledge of the position and width of the notch. This information is available in the L1 signaling parameters NOTCH_WIDTH and NOTCH_START (assuming that this information can be decoded from the preamble symbol).

Figure 12:
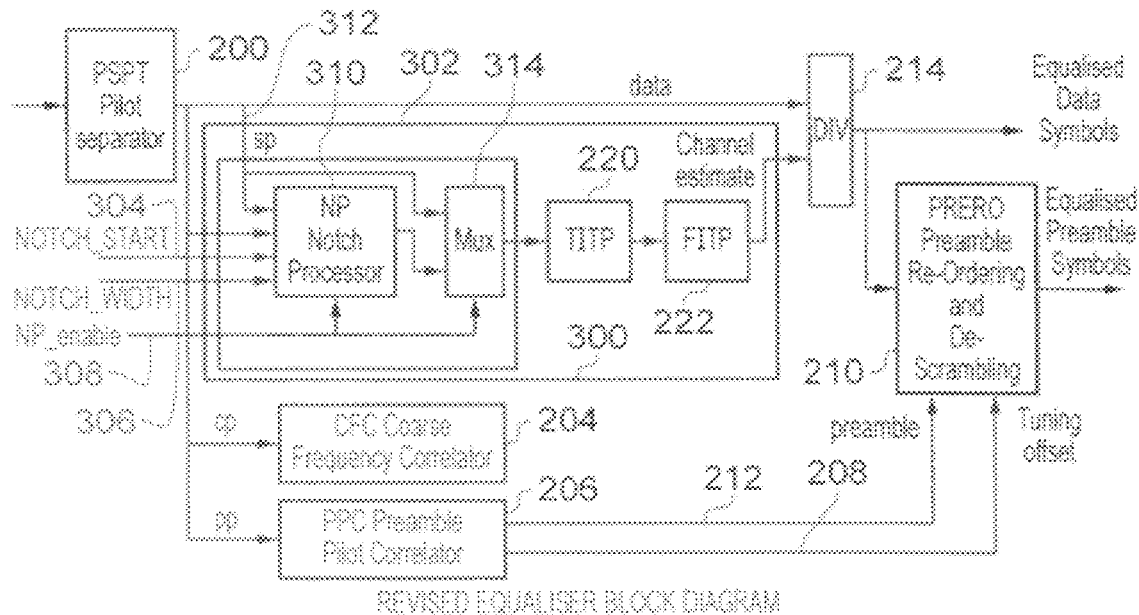
FIG. 12 provides a schematic diagram of an equaliser for the OFDM receiver shown in FIG. 2 according to an embodiment of the present technique.

According to the present technique, three methods can be used for notch processing:

Use a copy of notch start/end edge pilot
Linear interpolation between the notch edge pilots
Linear interpolation between scattered pilots around the notch The estimation of the replacement pilot data symbols or sub-carriers is performed by an equaliser which is shown in FIG. 12. The equaliser shown in FIG. 12 corresponds to the equaliser shown in FIG. 10 which forms part of the channel estimation and correction unit 110, shown in FIG. 2 but has been adapted in accordance with the present technique. As shown in FIG. 12 the equaliser includes an adapted channel estimator 300 which operates in accordance with the present technique. The channel estimator 300 includes a processing unit 302 which receives on a first input 304 an indication of a start of a notch in the frequency domain, indication of the width of the notch in the frequency domain on the channel 306 and a notch processing an able flag 308. Thus in accordance with the present technique the notch enable signal on channel 308, the notch start signal on channel 304 and the notch width signal on 306 is provided as part of the layer 1 signalling parameters which are communicated to the receiver. The parameters provide an indication of a predetermined notch size and location which is received within a notch processing unit 310. The notch processing unit 310 also receives the scattered pilot signals for a channel 312. A multiplexer 314 at the output of the notch processing unit 312 is arranged to reform the received pilot sub-carriers and the replacement sub-carriers produced by the notch processing unit 310. Thus the notch processing unit 310 is arranged in operation to receive the scattered pilot sub-carriers as well as the edge notch sub-carriers and generate replacement pilot data symbols at locations within the OFDM symbol at which the frequency interpolation unit, 222 are expecting to receive samples of the channel provided by the pilot data symbols. The time and frequency interpolators 220, 222 operate to generate samples of the channel for each of the cells of the OFDM symbols as explained with reference to FIG. 10.

Example techniques for generating replacement pilot data symbols are illustrated in FIGS. 13a, 13b, 14 and 15.

Figure 13A:
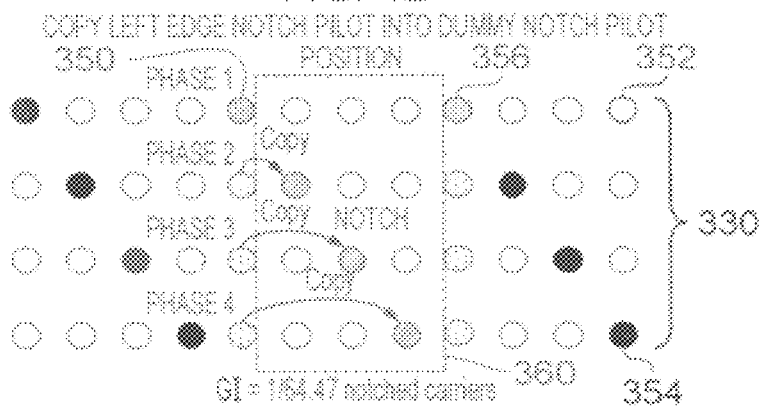
FIG. 13a provides a schematic diagram representing four OFDM symbols with a notch of 47 sub-carriers illustrating a technique for generating replacement sub-carriers by copying edge pilot sub-carriers from the left side of the notch.
Figure 13B:
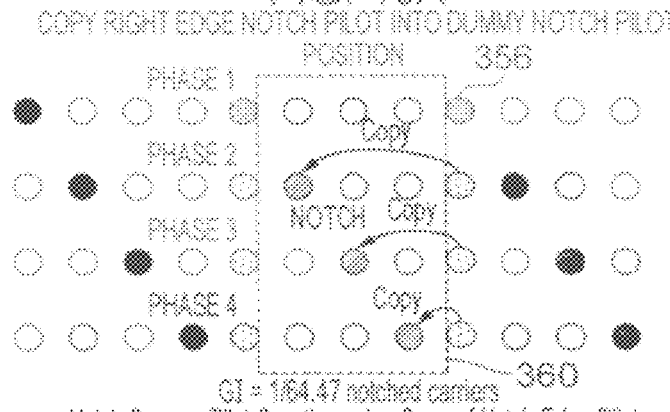
FIG. 13b provides a schematic diagram representing four OFDM symbols with a notch of 47 sub-carriers illustrating a technique for generating replacement sub-carriers by copying edge pilot sub-carriers from the right side of the notch.

FIGS. 13a and 13b provide an illustration of the generation of replacement pilot sub-carriers by copying pilot sub-carriers which have been received outside the notch elsewhere in the OFDM symbols. Copying the value of one of the notch edge pilots to the adjacent position in the decimated channel estimate corresponding to where the notch is located provides a simple technique for providing a pilot symbol at a location which is expected by the time and frequency interpolators 220, 222.

FIGS. 13a and 13b shows one configuration of guard interval=1/64 and maximum number of notched carriers. As shown in FIG. 13a, four OFDM symbols 350 including 12 example sub-carriers 352 are shown to include pilot sub-carriers 354 as well as notch edge sub-carriers to the right 356 and to the left 358 of the notch 360. Each of the four OFDM symbols 350 illustrates successive phases of a pilot sub-carrier pattern.

As shown in FIG. 13a and consistent with the phase of the pilot sub-carrier pattern the replacement pilot sub-carriers are generated at positions within the notch which are consistent with the pilot sub-carrier pattern which would have been generated before the scattered pilot if the notch had not been present. The replacement pilots are generated, for example, in 13a by copying the edge pilot sub-carriers to the left of the notch 350 into the respective positions at which the pattern of pilot sub-carriers would have produced a scattered pilot sub-carrier. The corresponding example is showing in FIG. 13b for the right hand edge pilots 356.

As will be appreciated the greater a separation between the sub-carrier being copied to the pilot sub-carrier position which is being replaced, the greater the error between the actual sample of the channel which would have been produced by that pilot sub-carrier if a pilot sub-carrier had been transmitted and the sample produced by copying the pilot sub-carrier from the position of that sub-carrier within the OFDM symbol. This is a result of changes in the channel in both the time and frequency domains. Therefore the replacement of the pilot values will be most accurate when the position of the pilot to be replaced is at is closest to the replacing edge pilot. In the example above this is using 'L' in position 'A' for the left edge notch pilot or using 'R' in position 'C' for the right edge notch pilot. For a 'good' quality channel this technique is reasonable as the pilot values vary only a little across the OFDM spectrum.

An alternative technique is illustrated in FIG. 14 in which the replacement pilot sub-carriers are generated using a linear interpolation between the notch edged pilots for both the left notch edge pilots 350 and the right notch edged pilots 356. This technique adds some complexity but improves the accuracy of the replacement pilot symbols in the notch. Using weighted proportions of the left and right notch edge pilots provides a straight-line approximation to the pilot symbol value. This improves the performance for more severely impaired channels with respect to the performance of the copying method explained above with reference to FIGS. 13a and 13b.

Since the technique shown in FIG. 14 is produced as result of copying right and left pilot sub-carriers a respective weighting of each of the components of these sub-carriers is required in dependence upon the relative position of the pilot sub-carrier being replaced from either the left or the right pilot sub-carriers. The weightings in one example which depend on the guard interval and the width of the notch are illustrated in a table showing in FIG. 15. In this table 'L' & 'R' refer to the values of the left and right hand edge pilots.

A further example of pilot replacement creation using linear interpolation is shown in FIG. 16. However, in the example showing in FIG. 16 the scattered pilot sub-carriers are used to perform linear interpolation either side of the notch with corresponding weighting factors required in order to effect the combination of the pilot data symbols produced from the scattered pilots within the OFDM symbols. This is a variation on the linear interpolation technique above without having to use the notch edge pilots. One advantage of this technique is that it simplifies the implementation compared with the linear interpolation of the notch edge pilots described above with reference to FIGS. 14 and 15 by having a fixed interpolation ratio of ½*L+½*R (where 'L' and 'R' are the values of the adjacent scattered pilots) regardless of notch width and guard interval. A disadvantage is that the scattered pilots have a DxDy spacing to the dummy pilot to be interpolated so the accuracy of the channel estimate is potentially reduced.

As will be appreciated according to example embodiments of the present technique the notch processor could use one or more of the techniques for replacing the pilot symbol values explained above with reference to FIGS. 13 to 16. In one example the notch processor may select which if the techniques to use depending on the type of channel or a form of the OFDM symbols in respect of a position and type of the pilot sub-carriers present outside the notch.

Figure 17:
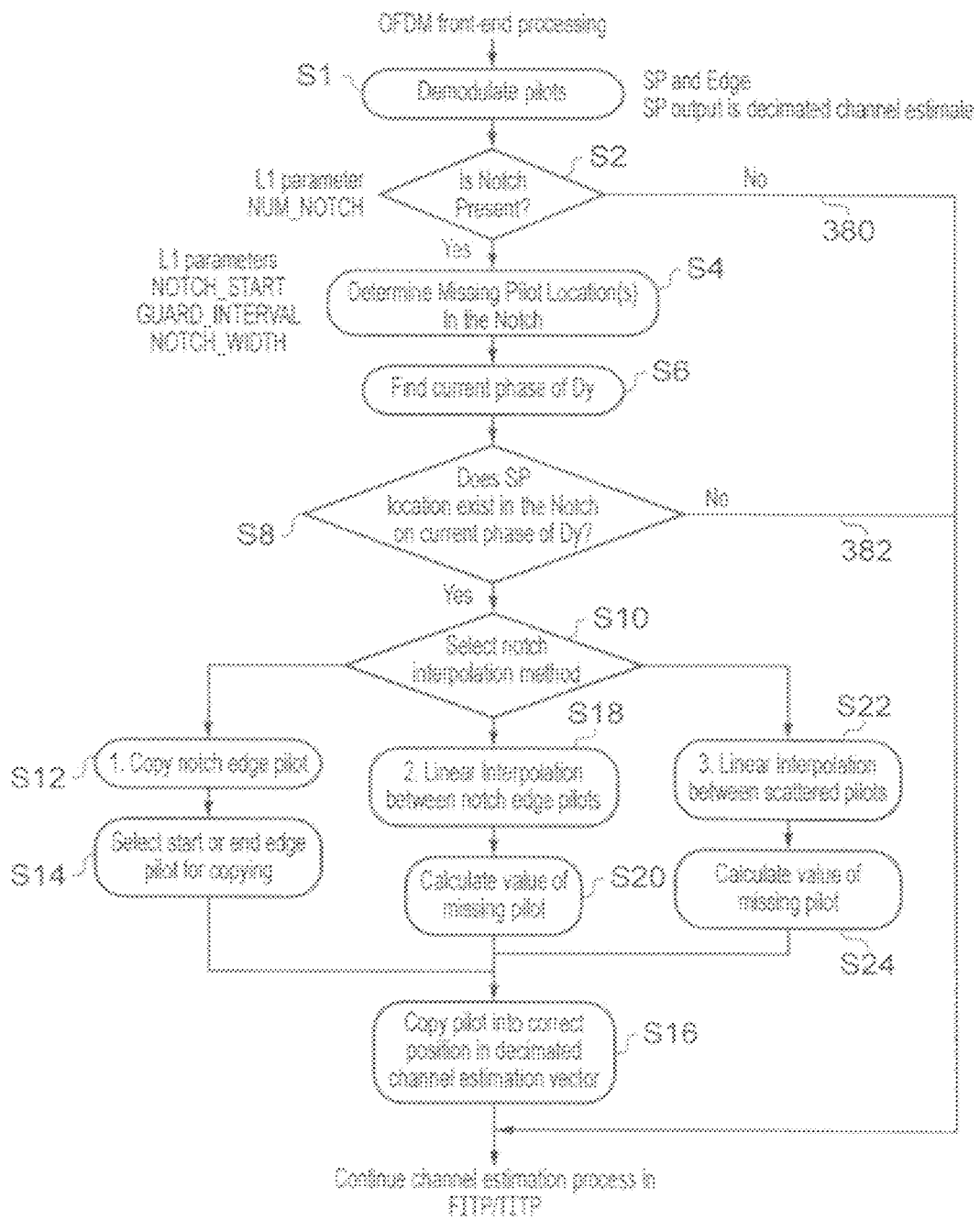
FIG. 17 is a flow diagram illustrating a process performed by the notch processor to generate replacement pilot sub-carriers which are missing as a result of a notch.

FIG. 17 provides an illustration of the operation of the notch processor 310 which is summarised as follows.

S1—The scattered and edge pilots are demodulated.

S2—The notch processor determines whether a notch is present or not. If a notch is not present then processing terminates following a process path 380. If a notch is determined to be present then processing proceeds with step S4.

S4—In accordance with received parameters indicating the notch start, the guard interval and the notch width, the notch processing unit determines the location of the pilots which are missing as a result of the notch and for which replacement pilot data symbols must be generated.

S6—The notch processor then determines for the received OFDM symbol what the present phase in the Dy of the pilot sub-carrier pattern, that is the time direction is present in order to perform the correct interpolation.

S8—At decision point S8 it is determined whether a scattered pilot exists at a location in the notch on the current phase of the scattered pilot pattern. If scattered pilot does exist and a replacement pilot data symbol is to be generated for that cell then processing proceeds to step S10. Otherwise processing proceeds via decision path 382 to terminate.

In accordance with one example of the present technique, in dependence upon the location of the scattered pilot to be replaced and the phase of the OFDM symbol then 1 of 3 interpolation techniques are used.

S12—In accordance with the present technique, one example for generating the replacement pilot data symbol is to copy a notch edge pilot if one is present from either the left or the right hand sides.

S14—Then the start or end edge pilot is selected for copying.

S16—The pilot sub-carrier is then copied into the correct position in the decimated channel estimate.

S18—If the decision step S10 selected the second technique for generating the replacement pilot data symbols, then at step S18 linear interpolation between the notch edge pilots as performed.

S20—In accordance with the selected technique the value of the missing or replacement pilots in generated and processing then proceeds to step S16.

S22—If the decision point at S10 the third technique is selected for generating the replacement pilot data symbols then at step S22 linear interpolation is performed between the scattered pilots.

S24—The value of the replacement pilot symbols is calculated in accordance with the linear interpolation between scattered pilots required by step S22 and processing then proceeds to step S16.

Acquisition Sequence

Figure 18:
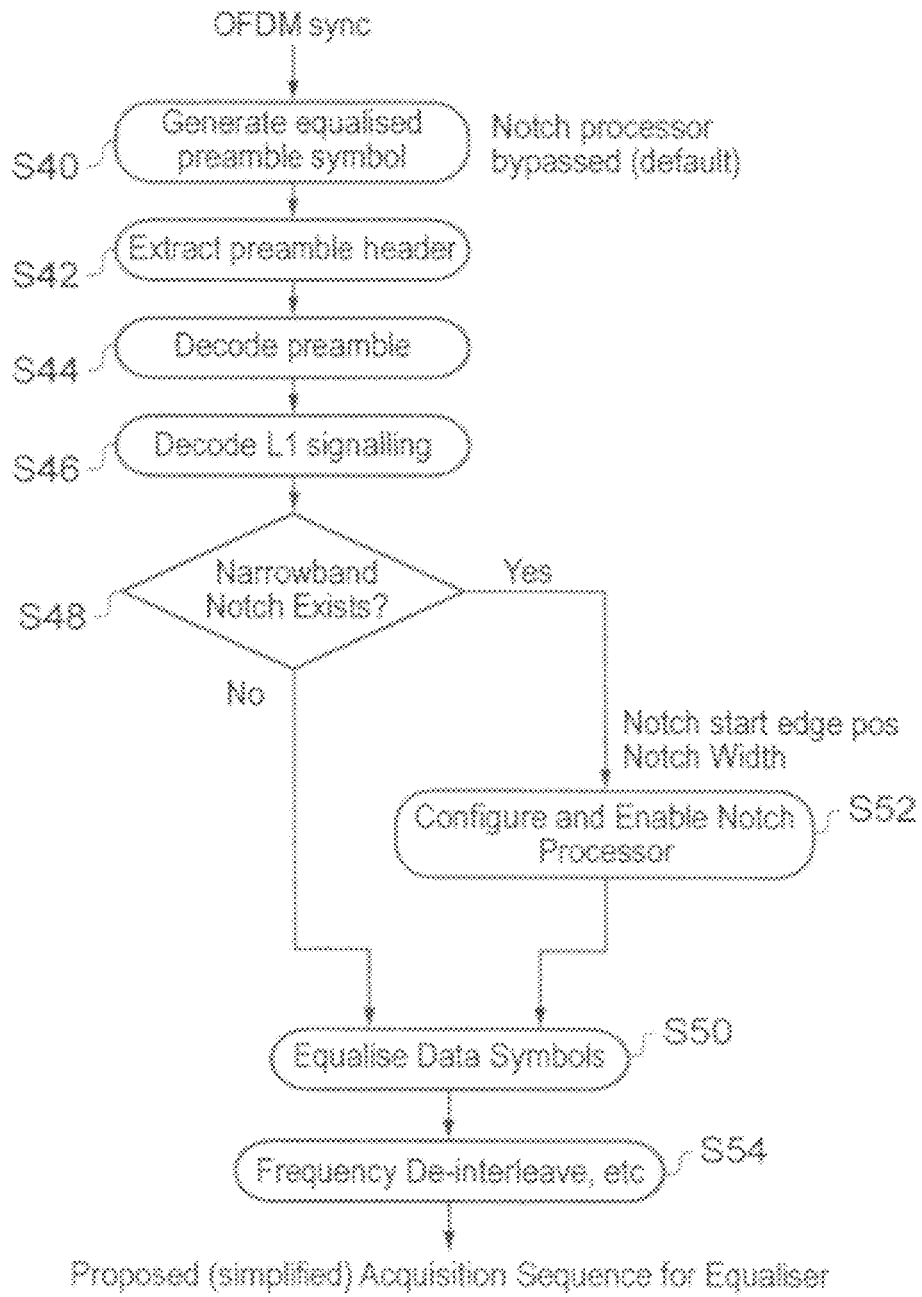
FIG. 18 is a flow diagram illustrating a process performed by the receiver following time and frequency acquisition to recover parameters which identify a size and location of a notch within received OFDM symbols according to DVB-C2.

A summary of operations performed by the receiver which follow after time and frequency synchronisation has been performed is shown in FIG. 18, which in one example can be used in combination with the present techniques to determine whether a notch is present in the received OFDM symbols and if so its size:

S40—An OFDM symbol sync is generated and an equalised preamble symbol is formed.

S42—A header is extracted from the preamble symbol.

S44—The preamble is decoded.

S46—The layer 1 signalling information is extracted from the decoded preamble.

S48—At decision point S48 it is determined according to the decoded layer 1 signalling data whether a notch exists within the received OFDM symbols. If a notch does not exist then processing proceeds to step S50. If a notch does exist then processing proceeds to step S52.

S52—In accordance with the received layer 1 signalling data the notch processor is enabled and configured to generate the replacement pilot data symbols in accordance with a width of the notch and a location of the pilot sub-carriers which are to be replaced as described above.

S50—The data symbols are equalised in accordance with the generated channel estimate produced by the notch processor or without the notch processor in accordance with the conventional pattern of scattered pilot symbols.

S54—In accordance with the conventional operation once the data symbols have been equalised by the division circuit 214, the cells are frequency de-interleaved.

Simulation Results

Figure 19:
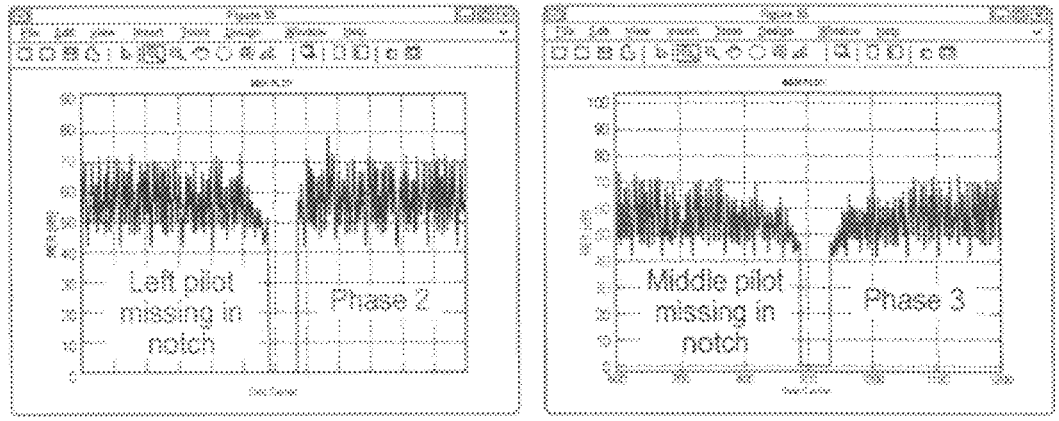
FIG. 19 provides a graphical representation of a plot of modulation error rate per carrier for a 47 sub-carrier notch using the copy of edge pilot sub-carriers from a left side of the notch for missing pilot sub-carriers for phases 2 and 3 of a predetermined pilot pattern.
Figure 20:
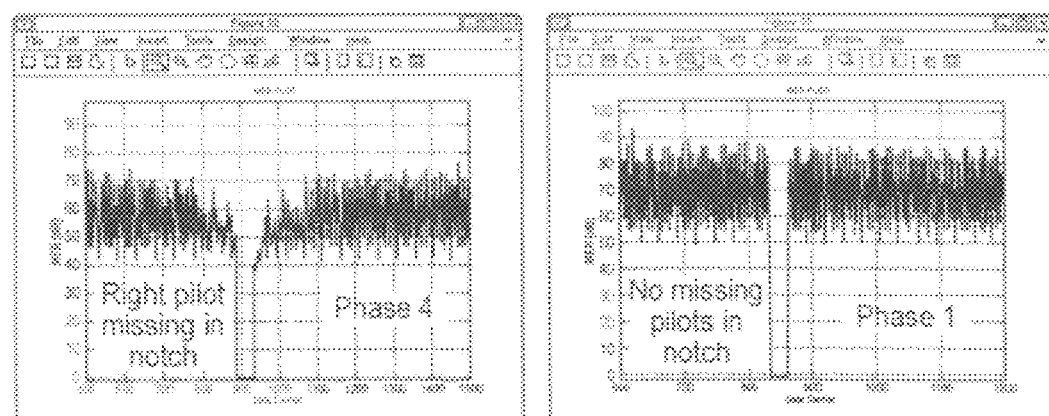
FIG. 20 provides a graphical representation of a plot of modulation error rate per carrier for a 47 sub-carrier notch using the copy of edge pilot sub-carriers from a left side of the notch for missing pilot sub-carriers for phases 1 and 4 of a predetermined pilot pattern.

Simulation results showing comparison between the different methods of generating the replacement pilot sub-carriers (or pilot symbol values) are illustrated in FIGS. 19, 20 and 21. FIG. 19 provides a plot of a modulation error rate (MER) per carrier for a 47 carrier notch using copy of left edge pilot for missing notches with a Dy phases of 2 and 3, and FIG. 20 provides a corresponding plot for phases 4 and 1. Observing the MER of each carrier around the notch can give some insight into the signal quality for different notch processing methods. FIGS. 19 and 20 show how the MER of the carriers around the notch is affected with the pilot symbol value replacement of copying the edge pilots. These examples use 4096-QAM with a notch 2 MHz offset into OFDM spectrum and 100 dB SNR.

A summary of performance of the notch edge processing is illustrated by a table shown in FIG. 20. FIG. 20 provides a the relative MER of the different notch methods. In the table of FIG. 20, the following references are used to refer to the different techniques for generating the replacement pilot symbol values:

CNEL: Copy left notch edge carrier
CNER: Copy left notch edge carrier.
LIE: Linear interpolation between notch edge carriers
LIS: Linear interpolation between adjacent scattered pilots As can be observed from the results provided in the table shown in FIG. 20, the LIE technique (Linear Interpolation between notch edge carriers) produces the best overall result. This is to be expected as the notch edge carriers are closest to the pilot positions in the notch. Lower SNR in the channel reduces the differences between the notch processing methods (compare Test 2 and 7 which are the same apart from SNR). This is expected as the number of carriers covered by the notch is a relatively small percentage of the total OFDM signal. Differences in average MER between having a notch and no notch (Test 2 & 7) reduce as the channel SNR drops.

If a notch happens to reside in a null in the frequency response caused by the echo channel characteristic then the differences between the notch processing methods increases (Test 2). The amplitude differences on carriers between the edges of the notch cause this difference—i.e. where there exists a high rate of change of amplitude with frequency in the channel response. As such:

For good quality channels the difference between the NP methods is small
A narrowband FM interferer centered in the notch shows little difference between the NP methods whether the amplitude ripple is good or poor across the OFDM carriers
A narrowband FM interferer positioned with an offset to the centre of the notch again shows little difference between NP methods. However, average MER drops significantly as the FM sidebands now affect more carriers just outside the notch at a higher level (and BER increases sharply). This scenario where the interferer is slightly offset from the notch centre is a probable one as the frequency location of the notched carriers at the transmitter has to be quantized to the scattered pilot spacing (26 or 53 kHz).

So, in summary the LIE method gives the best results and would therefore be the choice for implementation.

Other Embodiments

Figure 22:
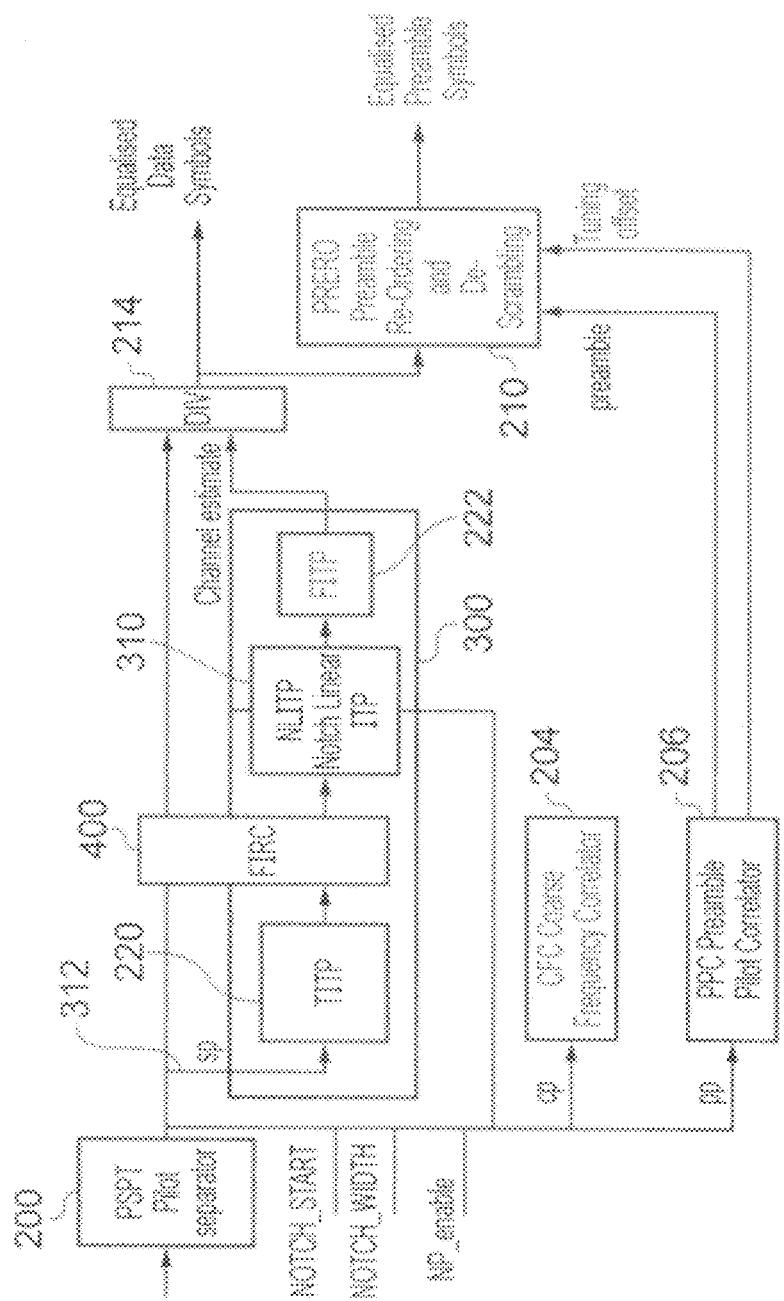
FIG. 22 provides a schematic diagram of an equaliser for the OFDM receiver shown in FIG. 2 according to another example embodiment of the present technique.

Another example embodiment of an equalizer which uses the notch processor according to the present technique is shown in FIG. 22 in which parts which also appear in FIGS. 10 and 12 have the same numerical designations. The equalizer shown in FIG. 22 corresponds substantially to the equalizer shown in FIG. 12 above except that the notch processor 310 is located after the time interpolator 220, but before the frequency interpolator 222. This is so that a frequency offset can be removed by a finite impulse response centering (FIRC) unit 400. This action has the effect of reducing a channel estimation error by slowing down the rate of change of the channel estimate. This is has the effect of making the estimated error smaller because the algorithm calculating the estimation error can more readily keep up with the channel estimate as it changes. As a result of the time interpolator 220 now being positioned before the notch processor 310 there needs to be additional logic in the time interpolator 220 so that the pilots in the notch are not processed by the time interpolator before reaching the notch processor 310.

Various modifications may be made to the embodiments herein before described. For example it will be understood that the particular component parts of which the channel estimator described above is comprised, for example the notch processing unit, the time interpolator, the frequency interpolator and the pilot extractor and the divider unit are logical designations. Accordingly, the functionality that these component parts may be manifested in ways that do no conform precisely to the forms described above and shown in the diagrams. For example aspects of the invention may be implemented in the form of a computer program product comprising instructions that may be implemented on a processor stored on a data sub-carrier such as a floppy disk, optical disk, hard disk, PROM, RAM, flash memory or any combination of these or other storage media, or transmitted via data signals on a network such as an Ethernet, a wireless network, the Internet, or any combination of these of other networks, or realised in hardware as an ASIC (application specific integrated circuit) or an FPGA (field programmable gate array) or other configurable or bespoke circuit suitable to use in adapting the conventional equivalent device.

Embodiments of the present invention may also find application with other appropriate transmission standards such as the terrestrial DVB transmission standards. However, it will be appreciated that the present invention is not limited to application with DVB and may be extended to other standards for transmission or reception, both fixed and mobile.

The invention claimed is:

1. A receiver for receiving data from a sequence of OFDM symbols transmitted via a channel, each OFDM symbol comprising a plurality of data bearing sub-carriers on which the data is transmitted and a plurality of pilot bearing sub-carriers on which pilot data symbols are transmitted, the pilot sub-carriers being arranged within the OFDM symbols in accordance with a predetermined pilot sub-carrier pattern, the receiver comprising:

a channel equalizer including:
a pilot data extractor configured to extract received pilot symbols from the pilot sub-carriers of each of the received OFDM symbols,
a channel estimator configured to generate an estimate of a channel through which the received OFDM symbols have passed using the received pilot symbols from the received pilot sub-carriers by comparing the received pilot symbols with a version of the pilot symbols transmitted with the OFDM symbols, and
a divider configured to reduce the effects of the channel on the received OFDM symbols using the estimate of the channel generated by the channel estimator, so that data can be recovered from the received OFDM symbols, wherein the channel estimator includes:
a notch processor configured to detect a notch in a received OFDM symbol, the notch providing a plurality of the sub-carriers of the received OFDM symbol within a frequency range which were not transmitted by the transmitter,
to determine one or more missing pilot sub-carriers which would have been transmitted within the notch sub-carriers of OFDM symbols according to the pilot sub-carrier pattern, and
to generate a replacement pilot symbol for a pilot data sub-carrier, which would have been transmitted according to the predetermined pattern but was not transmitted as a result of the notch, from one or more other pilot sub-carriers which have been received within OFDM symbols which are not within the notch, and
a pilot data interpolator which is arranged in operation to process the received pilot data symbols and the replacement pilot data symbol by interpolating between the received pilot data symbol and the replacement pilot data symbol in time and frequency to produce the estimate of the channel.

2. The receiver as claimed in claim 1, wherein the notch processor is further configured to generate the replacement pilot data symbol within each of one or more OFDM symbols from one or more of the pilot sub-carriers within the same OFDM symbol for which the replacement pilot data symbol is being generated.

3. The receiver as claimed in claim 2, wherein the notch processor is further configured to generate the replacement pilot data symbol by performing an interpolation between a plurality of pilot sub-carriers within the same OFDM symbol for which the replacement pilot data symbol is being generated.

4. The receiver as claimed in claim 3, wherein the OFDM symbols include scattered pilot sub-carriers at locations within the OFDM symbols, which change location from one OFDM symbols to the next in accordance with the predetermined pilot pattern, and the replacement pilot symbol which would have be transmitted is a scattered pilot symbol, the location of which is determined according to the predetermined pilot pattern, and the notch processor is further configured to generate the replacement pilot data symbol within each of one or more of the OFDM symbols by performing a linear interpolation between a plurality of the scattered pilot located outside the notch within the same OFDM symbol as the pilot data symbols to be replaced and in accordance with a location of the replacement pilot data symbol.

5. The receiver as claimed in claim 1, wherein the OFDM symbols include edge pilot sub-carriers disposed either side of the notch, and the notch processor is further configured to generate the replacement pilot data symbol within each of one or more of the OFDM symbols from one or more of the edge pilot sub-carrier symbols located either side of the notch within the same OFDM symbol as the pilot data symbols to be replaced.

6. The receiver as claimed in claim 5, wherein notch processor is further configured to generate the replacement pilot data symbol by copying an edge pilot symbol communicated by one of the pilot sub-carriers from one of the sides of the notch.

7. The receiver as claimed in claim 6, wherein the notch processor is further configured to generate the replacement pilot data symbols by combining a plurality of the pilot symbols located either side of the notch.

8. The receiver as claimed in claim 7, wherein the notch processor is further configured to generate the replacement pilot data symbols by weighting a value of the pilot symbols located either side of the notch and adding the weighted pilot symbol values.

9. The receiver as claimed in claim 1, wherein the notch processor is further configured:
to determine a location of the pilot sub-carrier within the OFDM symbol, which would have been transmitted within the notch, using the predetermined pattern of pilot sub-carriers, and
to generate the replacement pilot data symbol from the one or more other pilot data symbols in the OFDM symbol which are not within the notch, in accordance with a location of the pilot sub-carrier for which the replacement pilot data symbol is being generated, one of the one or more other pilot data symbols in the OFDM symbol including a pilot data symbol communicated by one of the pilot sub-carriers from one of the sides of the notch and the remaining pilot data symbols being located proximate to a position at which the replacement pilot is located a plurality of pilot sub-carriers within the same OFDM symbol for which the replacement pilot data symbol is being generated.

10. A method of receiving data from a sequence of OFDM symbols transmitted via a channel, each OFDM symbol comprising a plurality of data bearing sub-carriers on which the data is transmitted and a plurality of pilot bearing sub-carriers on which pilot data symbols are transmitted, the pilot sub-carriers being arranged within the OFDM symbols in accordance with a predetermined pilot sub-carrier pattern, the method comprising:
extracting received pilot data symbols from the pilot sub-carriers of each of the received OFDM symbols;
generating an estimate of a channel through which the received OFDM symbols have passed using received pilot data symbols from the received pilot sub-carriers by comparing the received pilot data symbols with a version of the pilot data symbols transmitted with the OFDM symbols; and
reducing the effects of the channel on the received OFDM symbols using the estimate of the channel using a divider, so that data can be recovered from the received OFDM symbols, wherein the generating the estimate of the channel further includes:
detecting a notch in a received OFDM symbol, the notch providing a plurality of the sub-carriers of the received OFDM symbol within a frequency range which were not transmitted by the transmitter,
determining one or more of missing pilot sub-carriers which would have been transmitted within the notch sub-carriers of OFDM symbols according to the pilot sub-carrier pattern, and
generating one or more replacement pilot data symbol for a missing pilot data sub-carrier, which would have been transmitted according to the predetermined pattern but was not transmitted as a result of the notch, from one or more other pilot sub-carriers which have been received within OFDM symbols which are not within the notch, and
processing the received pilot data symbols and the replacement pilot data symbol by interpolating between the pilot data symbols in time and frequency to produce the estimate of the channel.

11. The method as claimed in claim 10, wherein the generating the replacement pilot data symbol further includes generating the replacement pilot data symbol within each of one or more OFDM symbols from one or more of the pilot sub-carriers within the same OFDM symbol for which the replacement pilot data symbol is being generated.

12. The method as claimed in claim 11, wherein the generating the replacement pilot data symbol further includes performing an interpolation between a plurality of pilot sub-carriers within the same OFDM symbol for which the replacement pilot data symbol is being generated.

13. The method as claimed in claim 12, wherein the OFDM symbols include scattered pilot sub-carriers at locations within the OFDM symbols, which change location from one OFDM symbols to the next in accordance with the predetermined pilot pattern, and the replacement pilot symbol which would have be transmitted is a scattered pilot symbol, the location of which is determined according to the predetermined pilot pattern, and the generating the replacement pilot data symbol within each of one or more of the OFDM symbols, includes performing a linear interpolation between a plurality of the scattered pilot located outside the notch within the same OFDM symbol as the pilot data symbols to be replaced and in accordance with a location of the replacement pilot data symbol.

14. The method as claimed in claim 10, wherein the OFDM symbols include edge pilot sub-carriers disposed either side of the notch, and the generating the replacement pilot data symbol further includes generating the replacement pilot data symbol within each of one or more of the OFDM symbols from one or more of the edge pilot sub-carrier symbols located either side of the notch within the same OFDM symbol as the pilot data symbols to be replaced.

15. The method as claimed in claim 14, wherein the generating the replacement pilot data symbol further includes copying an edge pilot data symbol communicated by one of the pilot sub-carriers from one of the sides of the notch.

16. The method as claimed in claim 15, wherein the generating the replacement pilot data symbol further includes combining a plurality of the pilot data symbols located either side of the notch.

17. The method as claimed in claim 16, wherein the generating the replacement pilot data symbol further includes weighting a value of the pilot data symbols located either side of the notch and adding the weighted pilot symbol values.

18. The method as claimed in claim 10, wherein the generating the replacement pilot data symbol further includes:
  determining a location of the missing pilot sub-carrier within the OFDM symbol, which would have been transmitted within the notch, using the predetermined pattern of pilot sub-carriers, and
  generating the replacement pilot data symbol from the one or more other pilot data symbols in the OFDM symbol which are not within the notch, in accordance with a location of the pilot sub-carrier for which the replacement pilot data symbol is being generated.

19. A non-transitory computer readable medium having executable instructions stored therein, which when executed by a processor causes the processor to perform the method according to any one of claims 10 to 18.

* * * * *